(12) United States Patent
Pattanasinth et al.

(10) Patent No.: US 9,099,134 B1
(45) Date of Patent: Aug. 4, 2015

(54) DATA STORAGE DEVICE EMPLOYING MULTIPLE JOG PROFILES FOR A BUTTERFLY WRITTEN DISK SURFACE

(71) Applicant: Western Digital Technologies, Inc., Irvine, CA (US)

(72) Inventors: Suruk Pattanasinth, Irvine, CA (US); Margaret Wong, Irvine, CA (US); Paul C. Santa Ana, Las Vegas, NV (US); Xing Huo, Irvine, CA (US); Kameron Kam-Wai Jung, Yorba Linda, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/607,040

(22) Filed: Jan. 27, 2015

(51) Int. Cl.
*G11B 5/596* (2006.01)

(52) U.S. Cl.
CPC .................................. *G11B 5/59627* (2013.01)

(58) Field of Classification Search
None
See application file for complete search history.

(56) References Cited

U.S. PATENT DOCUMENTS

| | | | |
|---|---|---|---|
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,185,063 B1 * | 2/2001 | Cameron | 360/75 |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |
| 6,292,912 B1 | 9/2001 | Cloke et al. | |
| 6,310,740 B1 | 10/2001 | Dunbar et al. | |
| 6,317,850 B1 | 11/2001 | Rothberg | |
| 6,327,106 B1 | 12/2001 | Rothberg | |
| 6,337,778 B1 | 1/2002 | Gagne | |
| 6,369,969 B1 | 4/2002 | Christiansen et al. | |

(Continued)

*Primary Examiner* — Wayne Young
*Assistant Examiner* — James L Habermehl

(57) ABSTRACT

A data storage device is disclosed comprising a head actuated over a disk comprising a plurality of data tracks, wherein the head comprises a write element radially offset from a read element by a writer/reader offset that varies relative to a radial location of the head over the disk. A first radial band (RB) of the data tracks is written from an outer diameter (OD) of the disk toward an inner diameter (ID) of the disk, and a first jog profile is calibrated for the first radial band that compensates for the writer/reader offset. A second RB is written from an ID to an OD, and a second jog profile is calibrated for the second RB that compensates for the writer/reader offset. The first RB is accessed using the first jog profile, and the second RB is accessed using the second jog profile.

12 Claims, 6 Drawing Sheets

(56) References Cited

U.S. PATENT DOCUMENTS

| | | |
|---|---|---|
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,498,693 B1 * | 12/2002 | Au et al. .................. 360/77.02 |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,754,030 B2 * | 6/2004 | Seng et al. .................. 360/77.02 |
| 6,757,481 B1 | 6/2004 | Nazarian et al. |
| 6,765,744 B2 * | 7/2004 | Gomez et al. .................. 360/75 |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |

(56) References Cited

U.S. PATENT DOCUMENTS

| | | | |
|---|---|---|---|
| 7,075,747 B2 * | 7/2006 | Takaishi | 360/77.04 |
| 7,076,604 B1 | 7/2006 | Thelin | |
| 7,082,494 B1 | 7/2006 | Thelin et al. | |
| 7,088,538 B1 | 8/2006 | Codilian et al. | |
| 7,088,545 B1 | 8/2006 | Singh et al. | |
| 7,092,186 B1 | 8/2006 | Hogg | |
| 7,095,577 B1 | 8/2006 | Codilian et al. | |
| 7,099,095 B1 | 8/2006 | Subrahmanyam et al. | |
| 7,102,840 B2 * | 9/2006 | Sado | 360/48 |
| 7,106,537 B1 | 9/2006 | Bennett | |
| 7,106,947 B2 | 9/2006 | Boyle et al. | |
| 7,110,202 B1 | 9/2006 | Vasquez | |
| 7,111,116 B1 | 9/2006 | Boyle et al. | |
| 7,114,029 B1 | 9/2006 | Thelin | |
| 7,120,737 B1 | 10/2006 | Thelin | |
| 7,120,806 B1 | 10/2006 | Codilian et al. | |
| 7,126,776 B1 | 10/2006 | Warren, Jr. et al. | |
| 7,129,763 B1 | 10/2006 | Bennett et al. | |
| 7,133,600 B1 | 11/2006 | Boyle | |
| 7,136,244 B1 | 11/2006 | Rothberg | |
| 7,146,094 B1 | 12/2006 | Boyle | |
| 7,149,046 B1 | 12/2006 | Coker et al. | |
| 7,150,036 B1 | 12/2006 | Milne et al. | |
| 7,155,616 B1 | 12/2006 | Hamlin | |
| 7,171,108 B1 | 1/2007 | Masters et al. | |
| 7,171,110 B1 | 1/2007 | Wilshire | |
| 7,194,576 B1 | 3/2007 | Boyle | |
| 7,200,698 B1 | 4/2007 | Rothberg | |
| 7,205,805 B1 | 4/2007 | Bennett | |
| 7,206,497 B1 | 4/2007 | Boyle et al. | |
| 7,215,496 B1 | 5/2007 | Kupferman et al. | |
| 7,215,771 B1 | 5/2007 | Hamlin | |
| 7,237,054 B1 | 6/2007 | Cain et al. | |
| 7,240,161 B1 | 7/2007 | Boyle | |
| 7,249,365 B1 | 7/2007 | Price et al. | |
| 7,263,709 B2 | 8/2007 | Krapf | |
| 7,274,639 B1 | 9/2007 | Codilian et al. | |
| 7,274,659 B2 | 9/2007 | Hospodor | |
| 7,275,116 B1 | 9/2007 | Hanmann et al. | |
| 7,280,302 B1 | 10/2007 | Masiewicz | |
| 7,292,774 B1 | 11/2007 | Masters et al. | |
| 7,292,775 B1 | 11/2007 | Boyle et al. | |
| 7,296,284 B1 | 11/2007 | Price et al. | |
| 7,302,501 B1 | 11/2007 | Cain et al. | |
| 7,302,579 B1 | 11/2007 | Cain et al. | |
| 7,318,088 B1 | 1/2008 | Mann | |
| 7,319,806 B1 | 1/2008 | Willner et al. | |
| 7,325,244 B2 | 1/2008 | Boyle et al. | |
| 7,330,323 B1 | 2/2008 | Singh et al. | |
| 7,346,790 B1 | 3/2008 | Klein | |
| 7,366,641 B1 | 4/2008 | Masiewicz et al. | |
| 7,369,340 B1 | 5/2008 | Dang et al. | |
| 7,369,343 B1 | 5/2008 | Yeo et al. | |
| 7,372,650 B1 | 5/2008 | Kupferman | |
| 7,380,147 B1 | 5/2008 | Sun | |
| 7,388,728 B1 * | 6/2008 | Chen et al. | 360/77.08 |
| 7,392,340 B1 | 6/2008 | Dang et al. | |
| 7,404,013 B1 | 7/2008 | Masiewicz | |
| 7,406,545 B1 | 7/2008 | Rothberg et al. | |
| 7,415,571 B1 | 8/2008 | Hanan | |
| 7,436,610 B1 | 10/2008 | Thelin | |
| 7,437,502 B1 | 10/2008 | Coker | |
| 7,440,214 B1 | 10/2008 | Ell et al. | |
| 7,451,344 B1 | 11/2008 | Rothberg | |
| 7,466,509 B1 * | 12/2008 | Chen et al. | 360/75 |
| 7,471,483 B1 | 12/2008 | Ferris et al. | |
| 7,471,486 B1 | 12/2008 | Coker et al. | |
| 7,486,060 B1 | 2/2009 | Bennett | |
| 7,496,493 B1 | 2/2009 | Stevens | |
| 7,518,819 B1 | 4/2009 | Yu et al. | |
| 7,526,184 B1 | 4/2009 | Parkinen et al. | |
| 7,539,924 B1 | 5/2009 | Vasquez et al. | |
| 7,543,117 B1 | 6/2009 | Hanan | |
| 7,551,383 B1 | 6/2009 | Kupferman | |
| 7,562,282 B1 | 7/2009 | Rothberg | |
| 7,567,403 B2 * | 7/2009 | Sacks et al. | 360/75 |
| 7,576,941 B1 * | 8/2009 | Chen et al. | 360/77.04 |
| 7,577,973 B1 | 8/2009 | Kapner, III et al. | |
| 7,596,797 B1 | 9/2009 | Kapner, III et al. | |
| 7,599,139 B1 | 10/2009 | Bombet et al. | |
| 7,619,841 B1 | 11/2009 | Kupferman | |
| 7,647,544 B1 | 1/2010 | Masiewicz | |
| 7,649,704 B1 | 1/2010 | Bombet et al. | |
| 7,653,927 B1 | 1/2010 | Kapner, III et al. | |
| 7,656,603 B1 | 2/2010 | Xing | |
| 7,656,763 B1 | 2/2010 | Jin et al. | |
| 7,657,149 B2 | 2/2010 | Boyle | |
| 7,672,072 B1 | 3/2010 | Boyle et al. | |
| 7,673,075 B1 | 3/2010 | Masiewicz | |
| 7,679,851 B1 * | 3/2010 | Sun et al. | 360/77.02 |
| 7,688,540 B1 | 3/2010 | Mei et al. | |
| 7,724,461 B1 | 5/2010 | McFadyen et al. | |
| 7,725,584 B1 | 5/2010 | Hanmann et al. | |
| 7,730,295 B1 | 6/2010 | Lee | |
| 7,760,458 B1 | 7/2010 | Trinh | |
| 7,768,776 B1 | 8/2010 | Szeremeta et al. | |
| 7,804,657 B1 | 9/2010 | Hogg et al. | |
| 7,813,954 B1 | 10/2010 | Price et al. | |
| 7,827,320 B1 | 11/2010 | Stevens | |
| 7,839,588 B1 | 11/2010 | Dang et al. | |
| 7,843,660 B1 | 11/2010 | Yeo | |
| 7,852,596 B2 | 12/2010 | Boyle et al. | |
| 7,859,782 B1 | 12/2010 | Lee | |
| 7,872,822 B1 | 1/2011 | Rothberg | |
| 7,898,756 B1 | 3/2011 | Wang | |
| 7,898,762 B1 | 3/2011 | Guo et al. | |
| 7,900,037 B1 | 3/2011 | Fallone et al. | |
| 7,903,366 B2 * | 3/2011 | Michinaga | 360/77.04 |
| 7,907,364 B2 | 3/2011 | Boyle et al. | |
| 7,929,234 B1 | 4/2011 | Boyle et al. | |
| 7,933,087 B1 | 4/2011 | Tsai et al. | |
| 7,933,090 B1 | 4/2011 | Jung et al. | |
| 7,934,030 B1 | 4/2011 | Sargenti, Jr. et al. | |
| 7,940,491 B2 | 5/2011 | Szeremeta et al. | |
| 7,944,639 B1 | 5/2011 | Wang | |
| 7,945,727 B2 | 5/2011 | Rothberg et al. | |
| 7,949,564 B1 | 5/2011 | Hughes et al. | |
| 7,974,029 B2 | 7/2011 | Tsai et al. | |
| 7,974,039 B1 | 7/2011 | Xu et al. | |
| 7,982,993 B1 | 7/2011 | Tsai et al. | |
| 7,984,200 B1 | 7/2011 | Bombet et al. | |
| 7,990,648 B1 | 8/2011 | Wang | |
| 7,992,179 B1 | 8/2011 | Kapner, III et al. | |
| 8,000,053 B1 | 8/2011 | Anderson | |
| 8,004,785 B1 | 8/2011 | Tsai et al. | |
| 8,006,027 B1 | 8/2011 | Stevens et al. | |
| 8,014,094 B1 | 9/2011 | Jin | |
| 8,014,977 B1 | 9/2011 | Masiewicz et al. | |
| 8,019,914 B1 | 9/2011 | Vasquez et al. | |
| 8,031,429 B2 * | 10/2011 | Gerasimov | 360/75 |
| 8,040,625 B1 | 10/2011 | Boyle et al. | |
| 8,078,943 B1 | 12/2011 | Lee | |
| 8,079,045 B2 | 12/2011 | Krapf et al. | |
| 8,082,433 B1 | 12/2011 | Fallone et al. | |
| 8,085,487 B1 | 12/2011 | Jung et al. | |
| 8,089,719 B1 | 1/2012 | Dakroub | |
| 8,090,902 B1 | 1/2012 | Bennett et al. | |
| 8,090,906 B1 | 1/2012 | Blaha et al. | |
| 8,091,112 B1 | 1/2012 | Elliott et al. | |
| 8,094,396 B1 | 1/2012 | Zhang et al. | |
| 8,094,401 B1 | 1/2012 | Peng et al. | |
| 8,116,020 B1 | 2/2012 | Lee | |
| 8,116,025 B1 | 2/2012 | Chan et al. | |
| 8,134,793 B1 | 3/2012 | Vasquez et al. | |
| 8,134,798 B1 | 3/2012 | Thelin et al. | |
| 8,139,301 B1 | 3/2012 | Li et al. | |
| 8,139,310 B1 | 3/2012 | Hogg | |
| 8,144,419 B1 | 3/2012 | Liu | |
| 8,145,452 B1 | 3/2012 | Masiewicz et al. | |
| 8,149,528 B1 | 4/2012 | Suratman et al. | |
| 8,154,812 B1 | 4/2012 | Boyle et al. | |
| 8,159,768 B1 | 4/2012 | Miyamura | |
| 8,161,328 B1 | 4/2012 | Wilshire | |
| 8,164,849 B1 | 4/2012 | Szeremeta et al. | |

(56) References Cited

U.S. PATENT DOCUMENTS

| | | |
|---|---|---|
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,223 B2 * | 1/2014 | Gerasimov ............... 360/77.08 |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 * | 4/2014 | Selvaraj .................. 360/75 |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,699,185 B1 * | 4/2014 | Teh et al. ................ 360/135 |
| 8,705,198 B1 * | 4/2014 | Hebbar et al. .......... 360/77.02 |
| 8,711,500 B1 | 4/2014 | Fong et al. |
| 8,711,506 B1 | 4/2014 | Giovenzana et al. |
| 8,711,665 B1 | 4/2014 | Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 8,896,961 B1 * | 11/2014 | Harllee, III ............. 360/77.02 |
| 8,982,496 B1 * | 3/2015 | Maeto et al. ............... 360/61 |
| 2004/0061967 A1 * | 4/2004 | Lee et al. ................. 360/75 |
| 2007/0030588 A1 | 2/2007 | Tsuchinaga et al. |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

* cited by examiner

DATA STORAGE DEVICE EMPLOYING MULTIPLE JOG PROFILES FOR A BUTTERFLY WRITTEN DISK SURFACE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to data sectors within a data track by modulating the write current of a write element, for example, using a non-return to zero (NRZ) signal, thereby writing magnetic transitions onto the disk surface. A read element (e.g., a magnetoresistive (MR) element) is then used to transduce the magnetic transitions into a read signal that is demodulated by a read channel. The read element may be offset radially from the write element, and therefore when writing to the disk and/or when reading from the disk a "jog" value is added to the servo system to account for the writer/reader offset. Since the jog value may change across the radius of the disk due to the skew angle of the head, prior art disk drives typically calibrate a jog profile that spans the radius of each disk surface. The jog profile is then used to generate a jog value corresponding to the radial location of the head when accessing a target data track on the disk surface.

DETAILED DESCRIPTION

Figure 1:
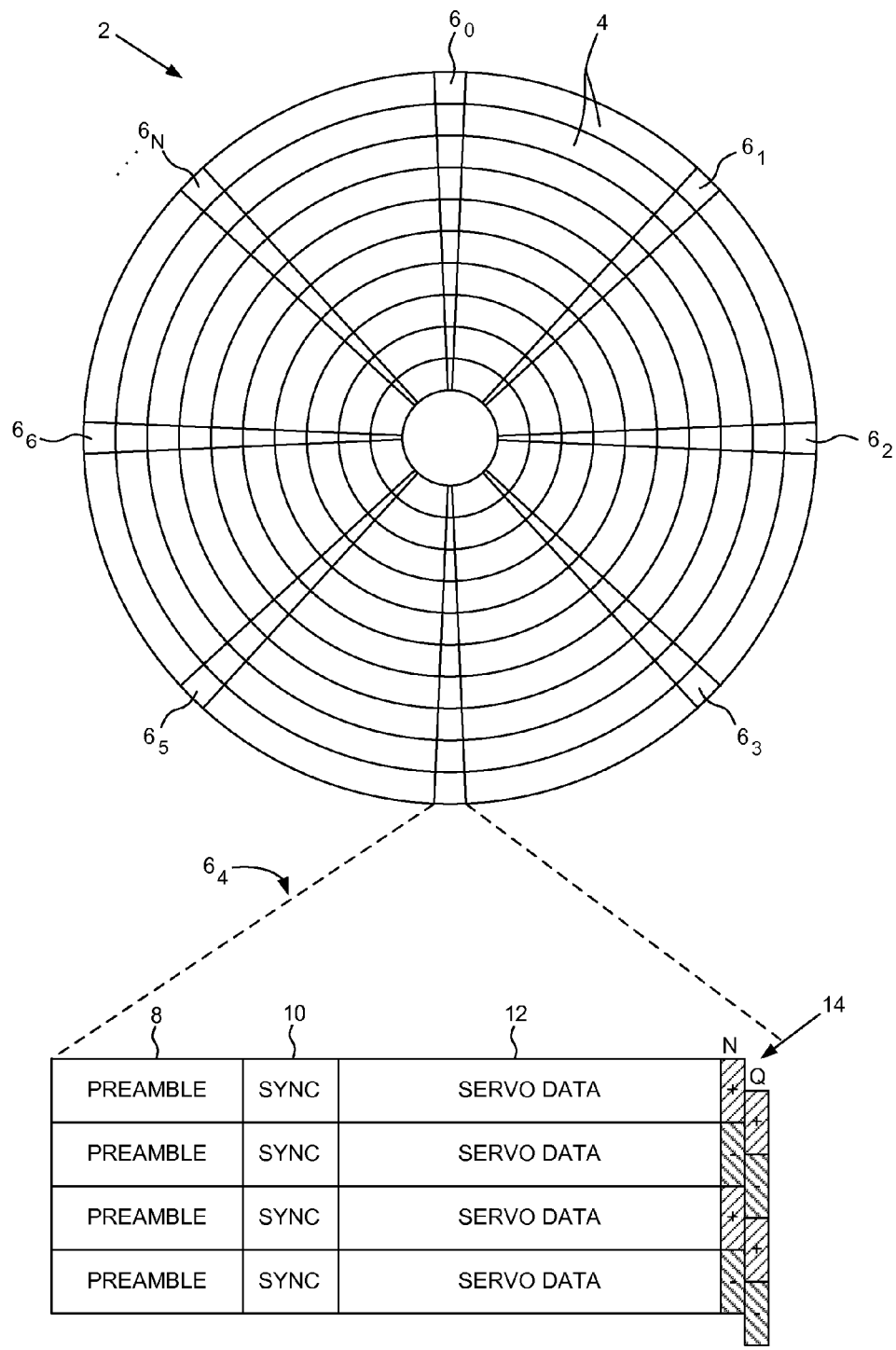
FIG. 1 shows a prior art disk format comprising a plurality of servo tracks defined by servo sectors.
Figure 2A:
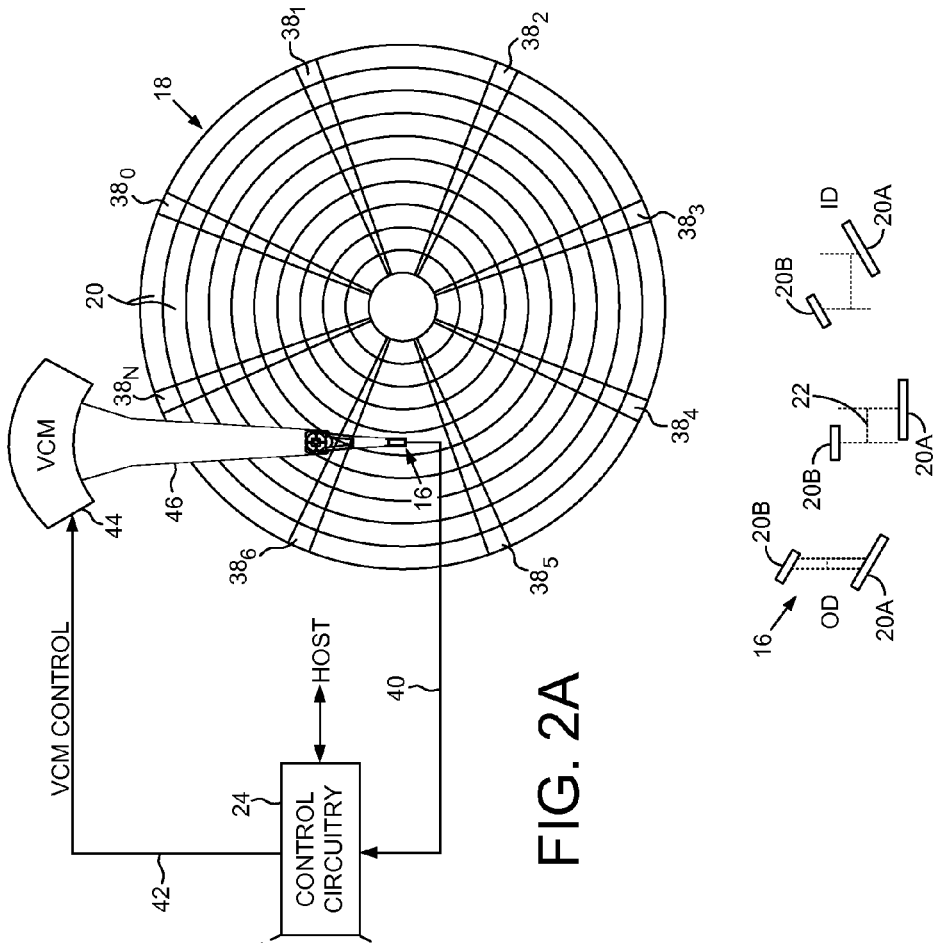
FIG. 2A shows a data storage device in the form of a disk drive comprising a head actuated over a disk.

FIG. 2A shows a data storage device in the form of a disk drive according to an embodiment comprising a head 16 actuated over a disk 18 comprising a plurality of data tracks 20, wherein the head 16 (FIG. 2B) comprises a write element 20A radially offset from a read element 20B by a writer/reader offset 22 that varies relative to a radial location of the head 16 over the disk 18. The disk drive further comprises control circuitry 24 configured to execute the flow diagram of FIG. 2C, wherein a first radial band of the data tracks is written from an outer diameter of the disk toward an inner diameter of the disk (block 26), and a first jog profile is calibrated for the first radial band that compensates for the writer/reader offset (block 28). A second radial band of the data tracks is written from an inner diameter of the disk toward an outer diameter of the disk (block 30), and a second jog profile is calibrated for the second radial band that compensates for the writer/reader offset (block 32). The first radial band of data tracks is accessed using the first jog profile (block 34), and the second radial band of data tracks is accessed using the second jog profile (block 36).

In the embodiment of FIG. 2A, the disk 18 comprises a plurality of servo tracks defined by servo sectors $38_0$-$38_N$, wherein the data tracks 20 are defined relative to the servo tracks at the same or different radial density. The control circuitry 24 processes a read signal 40 emanating from the head 16 to demodulate the servo sectors $38_0$-$38_N$ and generate a position error signal (PES) representing an error between the actual position of the head and a target position relative to a target track. The control circuitry 24 filters the PES using a suitable compensation filter to generate a control signal 42 applied to a voice coil motor (VCM) 44 which rotates an actuator arm 46 about a pivot in order to actuate the head 16 radially over the disk 18 in a direction that reduces the PES. The servo sectors $38_0$-$38_N$ may comprise any suitable head position information, such as a track address for coarse positioning and servo bursts for fine positioning. The servo bursts may comprise any suitable pattern, such as an amplitude based servo pattern or a phase based servo pattern.

Figure 2B:
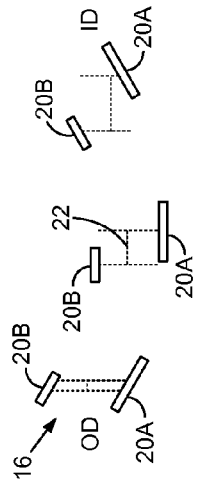
FIG. 2B shows an embodiment wherein the head comprises a write element radially offset from a read element by a writer/reader offset that varies relative to a radial location of the head over the disk.
Figure 2C:
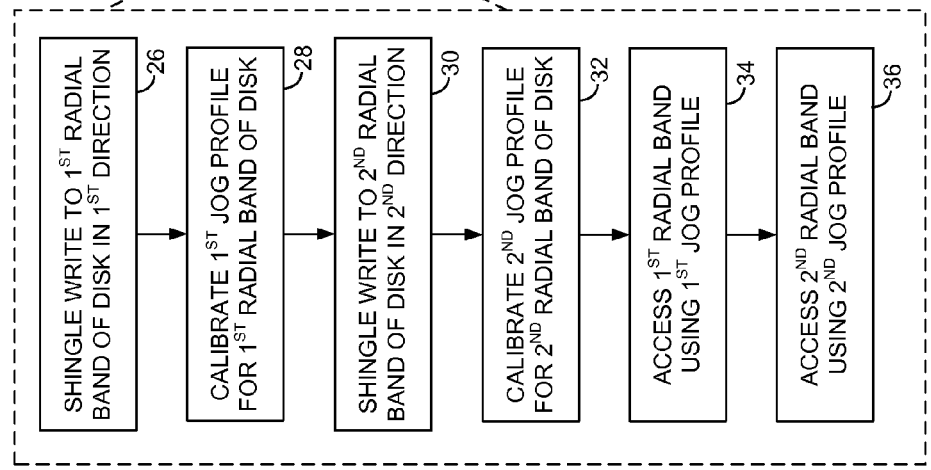
FIG. 2C is a flow diagram according to an embodiment wherein a first jog profile is calibrated for a first radial band that compensates for the writer/reader offset, and a second jog profile is calibrated for a second radial band that compensates for the writer/reader offset.

In one embodiment, a jog value is calibrated to account for the writer/reader offset 22 between the write element 20A and the read element 20B (FIG. 2B). For example, in embodiment during write operations the read element 20B may be servoed over a target servo step of a target servo track that corresponds to a target data track, and then data may be written at whatever radial location the write element 20A lands. To read the written data track, the read element 20B is positioned over a radial location equal to the original radial location during the write operation plus the calibrated jog value. In this embodiment, the written data will align at various different fractional locations between the servo tracks as the writer/reader offset changes with the skew angle of the head (FIG. 2B). In an alternative embodiment, a jog value may be introduced into the servo system during the write operations so that the written data is always substantially aligned at the same radial location with respect to the servo tracks (e.g., aligned with the center of the servo tracks). In either case, different jog values may be employed across the radius of the disk, such as by generating a jog value based on a jog profile that is a function of the target radial location during write and/or read operations.

Figure 3:
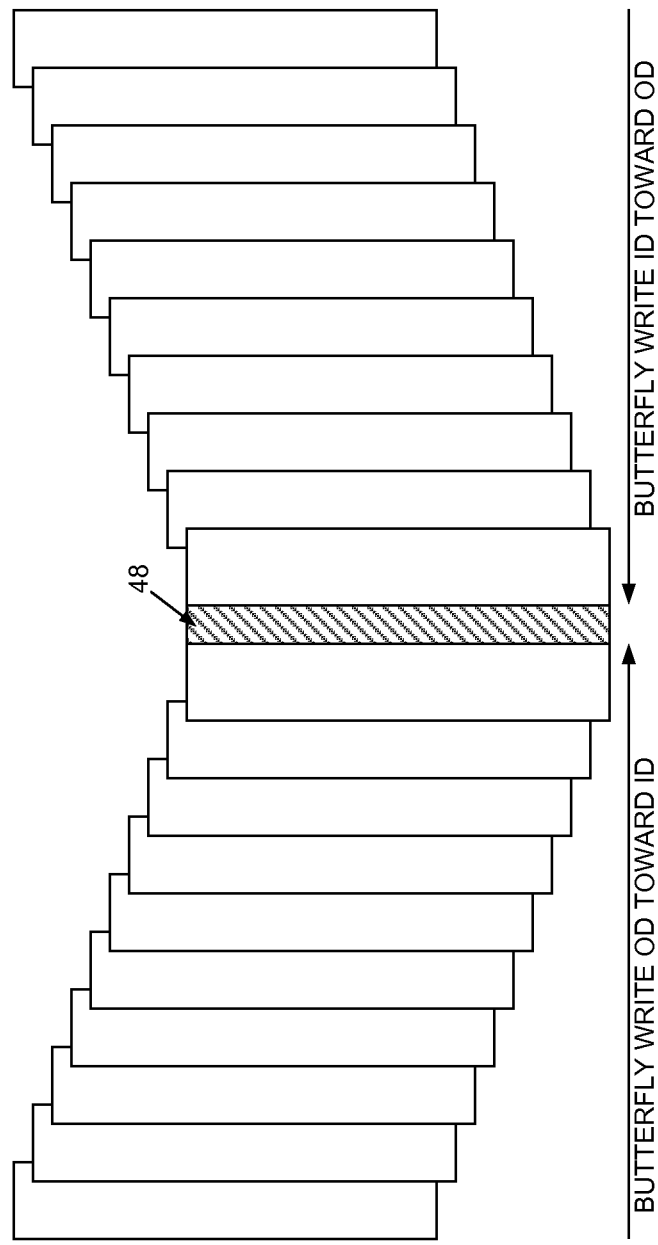
FIG. 3 shows an embodiment wherein data tracks are shingle written in a butterfly pattern by writing the data tracks in an overlapping manner and in opposite radial directions over the first and second radial bands.

In one embodiment illustrated in FIG. 3, the data tracks may be shingle written in order to increase the radial density of the data tracks, thereby increasing the capacity of the disk drive. With shingled writing, the data tracks are written in an overlapping manner such that a previously written data track may be partially overwritten by a newly written data track. FIG. 3 also illustrates an embodiment wherein the data tracks may be written in a butterfly pattern meaning that a first radial band of the data tracks are written from an outer diameter (OD) of the disk toward an inner diameter (ID) of the disk, and a second radial band of the data tracks are written from the ID of the disk toward the OD of the disk. In one embodiment, a guard band 48 may be defined comprising at least one of the data tracks at the center of the butterfly pattern which remains unused since this data track may be overwritten in both radial directions.

Figure 4A:
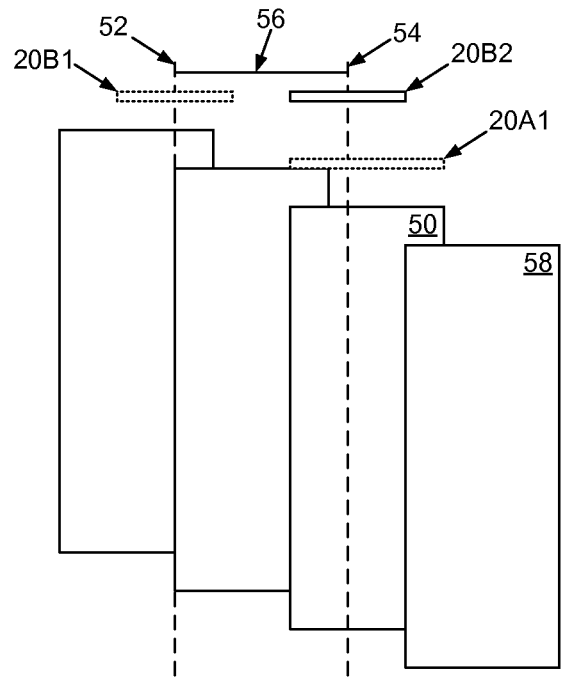
FIGS. 4A and 4B show an embodiment wherein the first jog profile is offset from the second jog profile by a delta corresponding to a percent that the data tracks overlap.
Figure 4B:
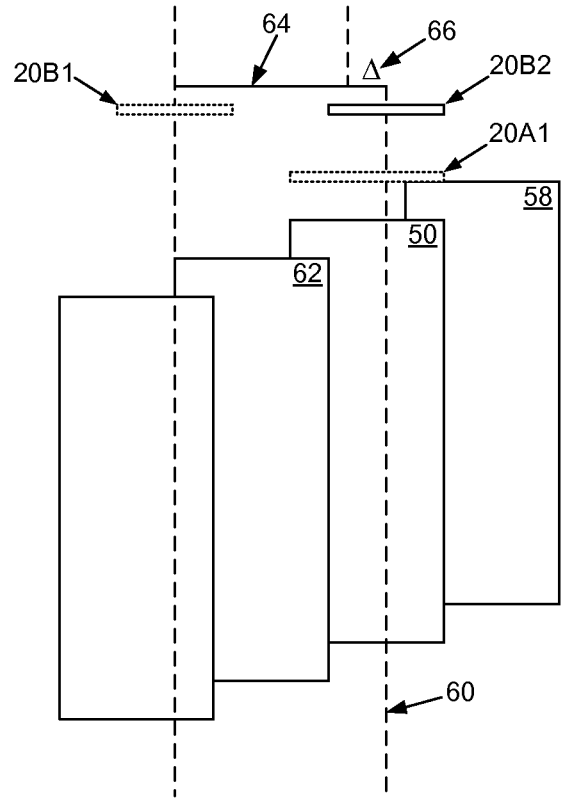

FIGS. 4A and 4B illustrate an embodiment wherein the jog value calibrated at any given radial location of the disk may be different depending on the radial direction of shingle writing. FIG. 4A shows the example wherein the data tracks are shingle written from the OD toward the ID. When data track 50 is written, the read element 20B1 is servoed over radial location 52 so that the write element 20A1 is aligned over the data track 50 as shown. When reading the data track 50, the read element 20B2 is positioned over radial location 54 which corresponds to the original radial location 52 plus the calibrated jog value 56. The read element 20B2 is positioned over radial location 54 since this location represents the center of the data track 50 after being overwritten by data track 58. If the data tracks are written in the opposite radial direction such as shown in FIG. 4B, the read element 20B1 is still positioned over radial location 52 in order to write data track 50 using the write element 20A1. However, when reading data track 50 shown in FIG. 4B, the read element 20B2 is positioned at radial location 60 since this location represents the center of the data track 50 after being overwritten by data track 62. The calibrated jog value 64 that represents the offset between the original radial location 52 when the data track 50 was written and the center of the data track 50 during a read operation differs from the calibrated jog value 56 shown in FIG. 4A by a delta 66 that corresponds to a percent that the data tracks overlap. Accordingly, in one embodiment a different jog profile may be calibrated for each radial band of data tracks that are butterfly written in a particular radial direction.

Figure 5:
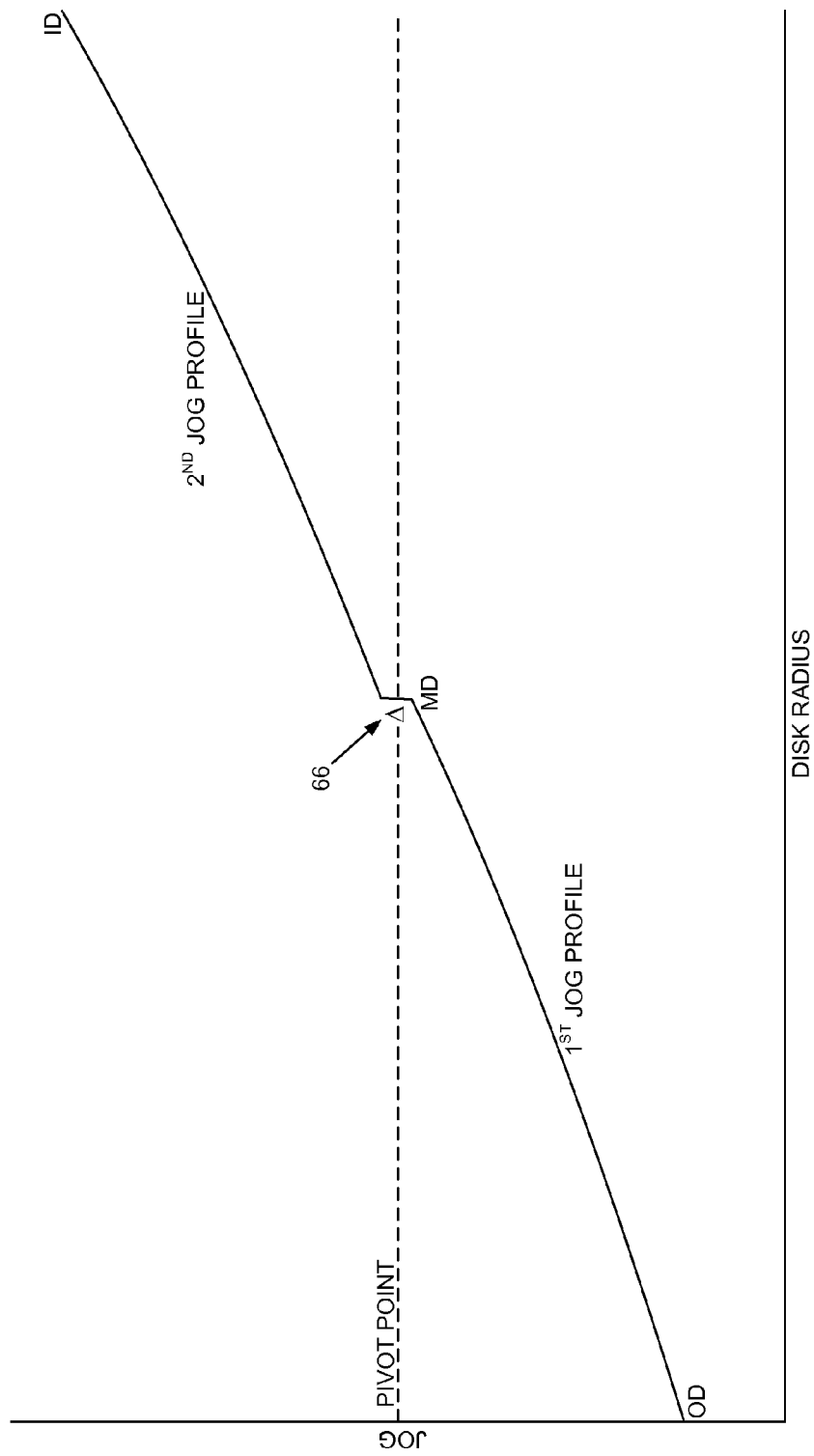
FIG. 5 shows first and second jog profiles corresponding to data tracks shingle written in a butterfly pattern toward the middle diameter of the disk according to an embodiment.

FIG. 5 shows an example embodiment wherein the disk 18 may be butterfly written over two radial bands of data tracks, including a first radial band shingle written from the OD to a middle diameter (MD) of the disk, and a second radial band shingle written from the ID to the MD of the disk. A first jog profile may be calibrated for the first radial band of data tracks, and a second jog profile may be calibrated for the second radial band of data tracks. In one embodiment, a jog value may be measured at multiple radial locations within each radial band of data tracks using any suitable technique, and the resulting data points curve fitted to a suitable function, such as a polynomial that represents the jog profile across the radial band. During normal operation, the jog value may be generated based on the jog profile using the target radial location as the input to the profile function. In the example shown in FIG. 5, the resulting first jog profile may be offset from the resulting second jog profile by the delta 66 described above with reference to FIGS. 4A and 4B at the transition between the first radial band and the second radial band (i.e., at the pivot point of the butterfly pattern).

Figure 6A:
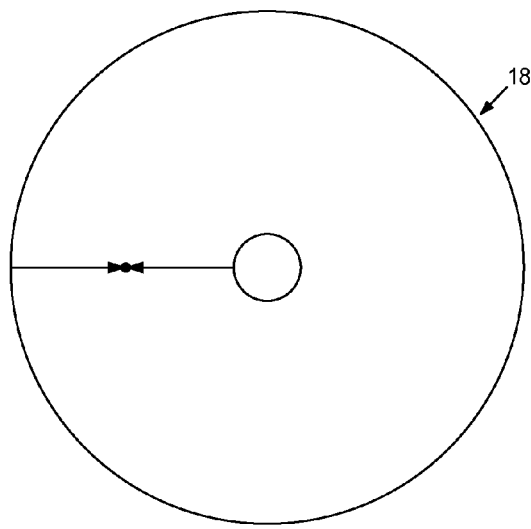
FIG. 6A shows an embodiment wherein the data tracks are shingle written from the outer diameter to the middle diameter of the disk, and shingle written from the inner diameter to the middle diameter.
Figure 6B:
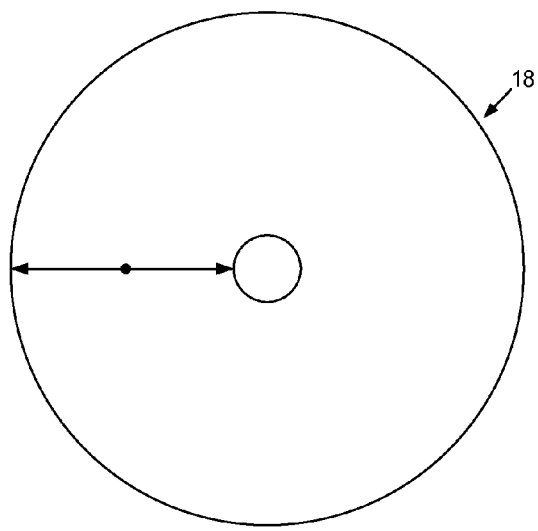
FIG. 6B shows an embodiment wherein the data tracks are shingle written from the middle diameter to the outer diameter of the disk, and shingle written from the middle diameter to the inner diameter.
Figure 6C:
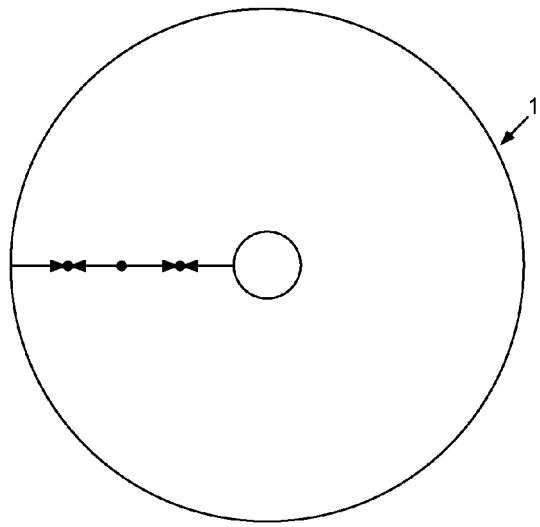
FIG. 6C shows an embodiment wherein the data tracks are shingle written in a butterfly pattern toward multiple radial locations.

FIG. 6A shows a disk 18 shingle written using the butterfly write pattern described above (i.e., a first radial band shingle written from the OD to MD and a second radial band shingle written from the ID to MD). However, any suitable butterfly pattern may be employed. FIG. 6B shows an example embodiment wherein the disk 18 is shingle written in a butterfly pattern that is opposite the pattern shown in FIG. 6A. FIG. 6C shows an example embodiment wherein the disk 18 is shingle written over two sets of radial bands, wherein each set is shingle written from OD toward ID and from ID toward OD. Other embodiments may employ any suitable combination of the butterfly patterns shown in FIGS. 6A-6C, wherein in one embodiment a different jog profile may be calibrated for each of the radial bands.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising a plurality of data tracks;
   a head actuated over the disk, the head comprising a write element radially offset from a read element by a writer/reader offset that varies relative to a radial location of the head over the disk; and
   control circuitry configured to:
      write to a first radial band of the data tracks from an outer diameter of the disk toward an inner diameter of the disk;
      calibrate a first jog profile for the first radial band that compensates for the writer/reader offset;
      write to a second radial band of the data tracks from an inner diameter of the disk toward an outer diameter of the disk;
      calibrate a second jog profile for the second radial band that compensates for the writer/reader offset;
      access the first radial band of data tracks using the first jog profile; and
      access the second radial band of data tracks using the second jog profile.

2. The data storage device as recited in claim 1, wherein:
   writing to the first radial band of the data tracks comprises shingle writing to the first radial band of the data tracks;
   writing to the second radial band of the data tracks comprises shingle writing to the second radial band of the data tracks; and
   the shingle writing comprising writing the data tracks in a partially overlapping manner.

3. The data storage device as recited in claim 2, wherein the first jog profile is offset from the second jog profile by a delta corresponding to a percent that the data tracks overlap.

4. The data storage device as recited in claim 1, wherein:
   the first radial band of the data tracks is substantially contiguous with the second radial band of the data tracks; and
   the first jog profile is offset from the second jog profile by a delta at the transition between the first radial band and the second radial band.

5. The data storage device as recited in claim 4, wherein:
   writing to the first radial band of the data tracks comprises shingle writing to the first radial band of the data tracks;
   writing to the second radial band of the data tracks comprises shingle writing to the second radial band of the data tracks;
   the shingle writing comprising writing the data tracks in a partially overlapping manner; and
   the delta corresponds to a percent that the data tracks overlap.

6. The data storage device as recited in claim 1, wherein:
   writing to the first radial band comprises writing from the outer diameter of the disk toward a middle diameter of the disk; and
   writing to the second radial band comprises writing from the inner diameter of the disk toward the middle diameter of the disk.

7. A method of operating a data storage device, the method comprising:
   a disk comprising a plurality of data tracks;
   a head actuated over the disk, the head comprising a write element radially offset from a read element by a writer/reader offset that varies relative to a radial location of the head over the disk; and
   control circuitry configured to:
      writing to a first radial band of data tracks from an outer diameter of a disk toward an inner diameter of the disk;
      calibrating a first jog profile for the first radial band that compensates for a writer/reader offset between a write element radially offset from a read element of a head;
      writing to a second radial band of the data tracks from an inner diameter of the disk toward an outer diameter of the disk;
      calibrating a second jog profile for the second radial band that compensates for the writer/reader offset;
      accessing the first radial band of data tracks using the first jog profile; and
      accessing the second radial band of data tracks using the second jog profile.

8. The method as recited in claim 7, wherein:
   writing to the first radial band of the data tracks comprises shingle writing to the first radial band of the data tracks;
   writing to the second radial band of the data tracks comprises shingle writing to the second radial band of the data tracks; and
   the shingle writing comprising writing the data tracks in a partially overlapping manner.

9. The method as recited in claim 8, wherein the first jog profile is offset from the second jog profile by a delta corresponding to a percent that the data tracks overlap.

10. The method as recited in claim 7, wherein:
   the first radial band of the data tracks is substantially contiguous with the second radial band of the data tracks; and the first jog profile is offset from the second jog profile by a delta at the transition between the first radial band and the second radial band.

11. The method as recited in claim 10, wherein:
writing to the first radial band of the data tracks comprises shingle writing to the first radial band of the data tracks;
writing to the second radial band of the data tracks comprises shingle writing to the second radial band of the data tracks;
the shingle writing comprising writing the data tracks in a partially overlapping manner; and
the delta corresponds to a percent that the data tracks overlap.

12. The method as recited in claim 7, wherein:
writing to the first radial band comprises writing from the outer diameter of the disk toward a middle diameter of the disk; and
writing to the second radial band comprises writing from the inner diameter of the disk toward the middle diameter of the disk.

* * * * *